(12) United States Patent
Kinoshita et al.

(10) Patent No.: US 9,046,275 B2
(45) Date of Patent: Jun. 2, 2015

(54) AIR CONDITIONER WITH ELECTROMAGNETIC INDUCTION HEATING UNIT

(75) Inventors: Hidehiko Kinoshita, Sakai (JP); Tsuyoshi Yamada, Sakai (JP)

(73) Assignee: Daikin Industries, Ltd., Osaka (JP)

( * ) Notice: Subject to any disclaimer, the term of this patent is extended or adjusted under 35 U.S.C. 154(b) by 815 days.

(21) Appl. No.: 13/203,636

(22) PCT Filed: Mar. 19, 2010

(86) PCT No.: PCT/JP2010/001983
§ 371 (c)(1),
(2), (4) Date: Aug. 26, 2011

(87) PCT Pub. No.: WO2010/106814
PCT Pub. Date: Sep. 23, 2010

(65) Prior Publication Data
US 2011/0314852 A1 Dec. 29, 2011

(30) Foreign Application Priority Data
Mar. 19, 2009 (JP) .................................. 2009-069101

(51) Int. Cl.
*F25B 27/00* (2006.01)
*F24F 1/06* (2011.01)
(Continued)

(52) U.S. Cl.
CPC . *F24F 1/06* (2013.01); *Y02B 30/66* (2013.01); *F25B 13/00* (2013.01); *F25B 47/022* (2013.01); *F25B 2313/008* (2013.01);
(Continued)

(58) Field of Classification Search
CPC .................................. F25B 1/00; Y02B 30/66

USPC ............................. 62/159, 160, 238.6, 238.7
See application file for complete search history.

(56) References Cited

U.S. PATENT DOCUMENTS

2002/0056280 A1 5/2002 Kim
2003/0172667 A1 9/2003 Takano et al.
(Continued)

FOREIGN PATENT DOCUMENTS

JP 52-150056 U 11/1977
JP 56-148576 U 11/1981
(Continued)

OTHER PUBLICATIONS

Corrected Version of International Preliminary Report of related PCT Application No. PCT/JP2010/001941.
(Continued)

*Primary Examiner* — Jonathan Bradford
(74) *Attorney, Agent, or Firm* — Global IP Counselors

(57) ABSTRACT

An air conditioner includes a refrigerant circuit, an electromagnetic induction heating unit, and a control unit. The refrigerant circuit has a compressing mechanism with an adjustable operating capacity, a heat source side heat exchanger, an expansion mechanism, and a utilization side heat exchanger. The electromagnetic induction heating unit heats a refrigerant piping and/or a member that is in thermal contact with a refrigerant that flows through the refrigerant piping. The control unit sets the electromagnetic induction heating unit to a forced inhibit state if any one of a condition in which the electromagnetic induction heating unit has been manually set to operation inhibited; a condition in which an air conditioning load is small; and a condition in which an amount of circulating refrigerant is small is satisfied.

15 Claims, 7 Drawing Sheets

(51) Int. Cl.
*F25B 13/00* (2006.01)
*F25B 47/02* (2006.01)

(52) U.S. Cl.
CPC .............. *F25B 2313/02741* (2013.01); *F25B 2313/0314* (2013.01); *F25B 2313/0315* (2013.01); *F25B 2313/0316* (2013.01); *F25B 2500/01* (2013.01); *F25B 2600/021* (2013.01); *F25B 2700/1931* (2013.01); *F25B 2700/2104* (2013.01); *F25B 2700/2106* (2013.01)

(56) References Cited

U.S. PATENT DOCUMENTS

| | | | |
|---|---|---|---|
| 2003/0213256 A1 | 11/2003 | Ueda et al. | |
| 2008/0078191 A1* | 4/2008 | Morishita et al. | 62/126 |
| 2008/0098760 A1* | 5/2008 | Seefeldt | 62/238.7 |

FOREIGN PATENT DOCUMENTS

| | | | |
|---|---|---|---|
| JP | 61-140738 A | 6/1986 | |
| JP | 61-246537 A | 11/1986 | |
| JP | 62-77574 A | 4/1987 | |
| JP | 1-111153 | 4/1989 | |
| JP | 3-59358 A | 3/1991 | |
| JP | 4-15446 A | 1/1992 | |
| JP | 4-80562 A | 3/1992 | |
| JP | 7-301459 A | 11/1995 | |
| JP | 11-248265 A | 9/1999 | |
| JP | 2000-28180 A | 1/2000 | |
| JP | 2000-97510 A | 4/2000 | |
| JP | 2000-220912 A | 8/2000 | |
| JP | 2001-174055 A | 6/2001 | |
| JP | 2001-255025 A | 9/2001 | |
| JP | 2002-5537 A | 1/2002 | |
| JP | 2002-106980 A | 4/2002 | |
| JP | 2002-195669 A | 7/2002 | |
| JP | 2003-42574 A | 2/2003 | |
| JP | 2003-269810 A | 9/2003 | |
| JP | 2004-3804 A | 1/2004 | |
| JP | 2004-3827 A | 1/2004 | |
| JP | 2007-127381 A | 5/2007 | |
| JP | 2007-178114 A | 7/2007 | |
| JP | 2007-212035 A | 8/2007 | |
| JP | 2007-212036 A | 8/2007 | |
| JP | 2007-255736 A | 10/2007 | |
| JP | 2008-2790 A | 1/2008 | |
| JP | 2008-164226 A | 7/2008 | |
| WO | 2007/091553 A1 | 8/2007 | |
| WO | WO 2007/119414 A1 | 10/2007 | |

OTHER PUBLICATIONS

International Search Report of corresponding PCT Application No. PCT/JP2010/001983.
International Search Report of corresponding PCT Application No. PCT/JP2010/001965.
International Search Report of corresponding PCT Application No. PCT/JP2010/001815.
International Search Report of corresponding PCT Application No. PCT/JP2010/001942.
International Search Report of corresponding PCT Application No. PCT/JP2010/001941.
International Search Report of corresponding PCT Application No. PCT/JP2010/001994.
International Search Report of corresponding PCT Application No. PCT/JP2010/002005.
International Search Report of corresponding PCT Application No. PCT/JP2010/001937.
International Search Report of corresponding PCT Application No. PCT/JP2010/001985.
International Preliminary Report of corresponding PCT Application No. PCT/JP2010/001983.
International Preliminary Report of related PCT Application No. PCT/JP2010/001965.
International Preliminary Report of related PCT Application No. PCT/JP2010/002005.
International Preliminary Report of related PCT Application No. PCT/JP2010/001937.
International Preliminary Report of related PCT Application No. PCT/JP2010/001985.
International Preliminary Report of related PCT Application No. PCT/JP2010/001941.
International Preliminary Report of related PCT Application No. PCT/JP2010/001815.
International Preliminary Report of related PCT Application No. PCT/JP2010/001942.
International Preliminary Report of related PCT Application No. PCT/JP2010/001994.
European Search Report of corresponding EP Application No. 10 75 3309.3 dated Feb. 25, 2015.

* cited by examiner

| SET LEVEL | PRESCRIBED TEMPERATURE (K) |
| --- | --- |
| LEVEL 1 | −0.5 |
| LEVEL 2 | 0.5 |
| LEVEL 3 | 1 |
| LEVEL 4 | 2 |

FIG. 7

AIR CONDITIONER WITH ELECTROMAGNETIC INDUCTION HEATING UNIT

CROSS-REFERENCE TO RELATED APPLICATIONS

This U.S. National stage application claims priority under 35 U.S.C. §119(a) to Japanese Patent Application No. 2009-069101, filed in Japan on Mar. 19, 2009, the entire contents of which are hereby incorporated herein by reference.

TECHNICAL FIELD

The present invention relates to an air conditioner that comprises a heating means inside a refrigerant circuit.

BACKGROUND ART

In the conventional art, an air conditioner is known (refer to Japanese Laid-open Patent Application Publication No. 2000-97510) that comprises a heating means inside a refrigerant circuit and supplements heating capacity by using the heating means to heat a refrigerant during a heating operation cycle. In the air conditioner of Japanese Laid-open Patent Application Publication No. 2000-97510, if the temperature of the refrigerant rises abnormally, then the output of a burner (i.e., of the heating means) is stopped.

SUMMARY

Technical Problem

Nevertheless, there is a need to conserve energy by stopping the output of the heating means at times other than when the output of the heating means is stopped for safety reasons (e.g., when there is an abnormal rise in the temperature of the refrigerant), for example, when there is no need for the heating means to produce heat. In other words, permitting the heating means to generate output only according to an appropriate timing could save energy.

An object of the present invention is to provide an air conditioner that can conserve energy by preventing a drop in operation efficiency.

Solution to Problem

An air conditioner according to a first aspect of the invention comprises a refrigerant circuit, an electromagnetic induction heating unit, and a control unit. The refrigerant circuit comprises a compressing mechanism, whose operating capacity is adjustable, a heat source side heat exchanger, an expansion mechanism, and a utilization side heat exchanger. The electromagnetic induction heating unit heats a refrigerant piping and/or a member that is in thermal contact with a refrigerant that flows through the refrigerant piping. The control unit sets the electromagnetic induction heating unit to a forced inhibit state if any one of conditions mentioned below is satisfied: a condition wherein the electromagnetic induction heating unit has been manually set to operation inhibited; a condition wherein an air conditioning load is small; and a condition wherein an amount of circulating refrigerant is small.

By its operation, the electromagnetic induction heating unit supplements, for example, the capacity of heating operation and the capacity needed for the hot gas during defrosting operation. If such an electromagnetic induction heating unit operates in the case wherein the air conditioning load is small, namely, when there is no need to supplement the capacity of heating operation, then operation efficiency degrades. In addition, if the electromagnetic induction heating unit is in the state wherein the circulating refrigerant amount is small, then the amount of the refrigerant heated by the electromagnetic induction heating unit will adversely decrease, which degrades the efficiency with which the electromagnetic induction heating unit performs heating. For these reasons, in the present invention, the electromagnetic induction heating unit is set to the forced inhibit state so that it does not operate if any one of the following conditions holds true: the electromagnetic induction heating unit has been manually set to operation inhibited; the air conditioning load is small; or the circulating refrigerant amount is small.

Accordingly, it is possible to prevent the wasteful operation of the electromagnetic induction heating unit if there is no need to heat the refrigerant and therefore operation efficiency would be reduced were the electromagnetic induction heating unit to operate. In addition, if the electromagnetic induction heating unit is set so that it does not operate (i.e., if the electromagnetic induction heating unit has been manually set to operation inhibited), then the operation of the electromagnetic induction heating unit can be inhibited.

An air conditioner according to a second aspect of the invention is the air conditioner according to the first aspect of the invention, wherein the condition wherein the amount of circulating refrigerant is small is the case wherein the pressure on a low pressure side is less than or equal to a first pressure and a limit is applied to the output of the compressing mechanism.

In the air conditioner of the present invention, the condition wherein the amount of circulating refrigerant is small is the case wherein the low-pressure pressure is less than or equal to the first pressure and a limit is applied to reduce the operating capacity of the compressing mechanism and thereby raise the low-pressure pressure. In such a case, in the present invention, the electromagnetic induction heating unit is set to the forced inhibit state so that it does not operate.

Accordingly, if efficiency decreases even though the refrigerant is being heated, then the operation of the electromagnetic induction heating unit can be inhibited.

An air conditioner according to a third aspect of the invention is the air conditioner according to the first or second aspect of the invention, wherein the condition wherein the amount of circulating refrigerant is small is the case wherein the pressure on a high pressure side is greater than or equal to a second pressure and a limit is applied to the output of the compressing mechanism.

In the air conditioner of the present invention, the condition wherein the amount of circulating refrigerant is small is the case wherein the high-pressure pressure is greater than or equal to the second pressure and a limit is applied to reduce the operating capacity of the compressing mechanism and thereby lower the high-pressure pressure. In such a case, in the present invention, the electromagnetic induction heating unit is set to the forced inhibit state so that it does not operate.

Accordingly, if efficiency decreases even though the refrigerant is being heated, then the operation of the electromagnetic induction heating unit can be inhibited.

An air conditioner according to a fourth aspect of the invention is the air conditioner according to any one aspect of the first through third aspects of the invention, wherein the condition wherein the amount of circulating refrigerant is small is the case wherein the temperature on a discharge side of the compressing mechanism deviates from a first temperature range and a limit is applied to the output of the compressing mechanism.

In the air conditioner of the present invention, one condition wherein the amount of circulating refrigerant is small is the case wherein the temperature on the discharge side of the compressing mechanism deviates from the first temperature range and a limit is applied to reduce the operating capacity of the compressing mechanism and thereby bring the temperature on the discharge side of the compressing mechanism into the first temperature range. In such a case, in the present invention, the electromagnetic induction heating unit is set to the forced inhibit state so that it does not operate.

Accordingly, if efficiency decreases even though the refrigerant is being heated, then the operation of the electromagnetic induction heating unit can be inhibited.

An air conditioner according to a fifth aspect of the invention is the air conditioner according to any one aspect of the first through fourth aspects of the invention, wherein the compressing mechanism comprises a motor, which serves as a motive power source, and has an operating capacity that is adjusted by using an inverter circuit to perform rotational frequency control on the motor. Furthermore, the condition wherein the amount of circulating refrigerant is small is the case wherein a limit is applied to the output of the compressing mechanism by using the inverter circuit to lower the rotational speed of the motor.

In the air conditioner of the present invention, one condition wherein the amount of circulating refrigerant is small is a case wherein the electric current that flows to the inverter circuit is excessively large and a limit is applied to reduce the operating capacity of the compressing mechanism by using the inverter to lower the rotational speed of the motor circuit and thereby reduce the electric current that flows to the inverter circuit. In such a case, in the present invention, the electromagnetic induction heating unit is set to the forced inhibit state so that it does not operate.

Accordingly, if efficiency decreases even though the refrigerant is being heated, then the operation of the electromagnetic induction heating unit can be inhibited.

An air conditioner according to a sixth aspect of the invention is the air conditioner according to any one aspect of the first through fifth aspects of the invention, and further comprises a heat source side fan. The heat source side fan promotes the exchange of heat by the heat source side heat exchanger. Furthermore, the condition wherein the amount of circulating refrigerant is small is the case wherein a pressure differential between the pressure on the high pressure side and the pressure on the low pressure side in the refrigerant circuit is smaller than a third pressure and a limit is applied to the output of the heat source side fan.

In the air conditioner of the present invention, one condition wherein the amount of circulating refrigerant is small is a case wherein the pressure differential between the pressure on the high pressure side and the pressure on the low pressure side is smaller than the third pressure and a limit is applied to reduce the operating capacity of the compressing mechanism and thereby set that pressure differential such that it is greater than or equal to the third pressure. In such a case, in the present invention, the electromagnetic induction heating unit is set to the forced inhibit state so that it does not operate.

Accordingly, if efficiency decreases even though the refrigerant is being heated, then the operation of the electromagnetic induction heating unit can be inhibited.

An air conditioner according to a seventh aspect of the invention is the air conditioner according to any one aspect of the first through sixth aspects of the invention, wherein the condition wherein the amount of circulating refrigerant is small is the case wherein an electric current value of the compressing mechanism deviates from a first prescribed range and a limit is applied to the output of the compressing mechanism or the case wherein the temperature of an electrical component in the inverter circuit deviates from a second temperature range and a limit is applied to the output of the compressing mechanism.

In the air conditioner of the present invention, one condition wherein the amount of circulating refrigerant is small is a case wherein a limit is applied to reduce the operating capacity of the compressing mechanism and thereby to bring the electric current value of the compressing mechanism into a second prescribed range if the electric current value of the compressing mechanism deviates from the first prescribed range or to bring the temperature of the electrical component in the inverter circuit into the second temperature range if the temperature of the electrical component in the inverter circuit deviates from the second temperature range. In such a case, in the present invention, the electromagnetic induction heating unit is set to the forced inhibit state so that does not operate.

Accordingly, if efficiency decreases even though the refrigerant is being heated, then the operation of the electromagnetic induction heating unit can be inhibited.

An air conditioner according to an eighth aspect of the invention is the air conditioner according to any one aspect of the first through seventh aspects of the invention, and further comprises the heat source side fan, which promotes the exchange of heat by the heat source side heat exchanger. The compressing mechanism, the heat source side heat exchanger, and the heat source side fan are included in a heat source unit. The condition wherein the amount of circulating refrigerant is small is the case wherein a total electric current value, which is the sum of the value of the electric current applied to the compressing mechanism and the value of the electric current applied to the heat source side fan, deviates from a second prescribed range and a limit is applied to the output of the compressing mechanism.

In the air conditioner of the present invention, one condition wherein the amount of circulating refrigerant is small is a case wherein the total electric current value deviates from the second prescribed range and a limit is applied to reduce the operating capacity of the compressing mechanism and thereby bring the total electric current value into the second prescribed range. In such a case, in the present invention, the electromagnetic induction heating unit is set to the forced inhibit state so that it does not operate.

Accordingly, if efficiency decreases even though the refrigerant is being heated, then the operation of the electromagnetic induction heating unit can be inhibited.

An air conditioner according to a ninth aspect of the invention is the air conditioner according to the eighth aspect of the invention, wherein the utilization side heat exchanger is included in a utilization unit. The total electric current value is a value calculated by adding the value of the electric current applied to the utilization unit and/or the value of the electric current applied to the electromagnetic induction heating unit to the value that is the sum of the value of the electric current applied to the compressing mechanism and the value of the electric current applied to the heat source side fan.

In the air conditioner of the present invention, even in the case wherein a value calculated by adding the value of the electric current applied to the utilization unit and/or the value of the electric current applied to the electromagnetic induction heating unit to the value that is the sum of the value of the electric current applied to the compressing mechanism and the value of the electric current applied to the heat source side fan is computed as the total electric current value, one condition wherein the amount of circulating refrigerant is small is a case wherein the total electric current value deviates from the second prescribed range and a limit is applied to reduce the operating capacity of the compressing mechanism and thereby bring the total electric current value into the second prescribed range. In such a case, in the present invention, the electromagnetic induction heating unit is set to the forced inhibit state so that it does not operate.

Accordingly, if efficiency decreases even though the refrigerant is being heated, then the operation of the electromagnetic induction heating unit can be inhibited.

An air conditioner according to a tenth aspect of the invention is the air conditioner according to any one aspect of the first through ninth aspects of the invention, wherein the condition wherein the amount of circulating refrigerant is small is the case wherein an amount of refrigerant filled in the refrigerant circuit deviates from a third prescribed range and a limit is applied to the output of the compressing mechanism.

In the air conditioner of the present invention, one condition wherein the amount of circulating refrigerant is small is a case wherein the amount of refrigerant filled in the refrigerant circuit deviates from the third prescribed range and a limit is applied to reduce the operating capacity of the compressing mechanism and thereby bring that amount of refrigerant into the third prescribed range. In such a case, in the present invention, the electromagnetic induction heating unit is set to the forced inhibit state so that it does not operate.

Accordingly, if efficiency decreases even though the refrigerant is being heated, then the operation of the electromagnetic induction heating unit can be inhibited.

An air conditioner according to an eleventh aspect of the invention is the air conditioner according to the tenth aspect of the invention, wherein the case wherein the amount of refrigerant filled in the refrigerant circuit deviates from the third prescribed range is the case wherein a suction overheating degree of the compressing mechanism exceeds a prescribed temperature.

In the air conditioner of the present invention, the amount of refrigerant is determined by determining whether the suction overheating degree of the compressing mechanism exceeds the prescribed temperature. Furthermore, if the suction overheating degree of the compressing mechanism does exceed the prescribed temperature, then it is determined that the amount of refrigerant deviates from the third prescribed range and that the circulating refrigerant amount is small. In such a case, there is a case wherein a limit is applied to reduce the operating capacity of the compressing mechanism and thereby bring the suction overheating degree of the compressing mechanism below or equal to the prescribed temperature. In such a case, in the present invention, the electromagnetic induction heating unit is set to the forced inhibit state so that it does not operate.

Accordingly, if efficiency decreases even though the refrigerant is being heated, then the operation of the electromagnetic induction heating unit can be inhibited.

Advantageous Effects of Invention

In the air conditioner according to the first aspect of the invention, it is possible to prevent the wasteful operation of the electromagnetic induction heating unit if there is no need to heat the refrigerant and therefore operation efficiency would be reduced were the electromagnetic induction heating unit to operate. In addition, if the electromagnetic induction heating unit is set so that it does not operate (i.e., if the electromagnetic induction heating unit has been manually set to operation inhibited), then the operation of the electromagnetic induction heating unit can be inhibited.

In the air conditioner according to the second through eleventh aspects of the invention, if efficiency decreases even though the refrigerant is being heated, then the operation of the electromagnetic induction heating unit can be inhibited.

BRIEF DESCRIPTION OF THE DRAWINGS

FIG. 7 is a relationship diagram that shows the relationship between prescribed temperatures and setting levels.

DESCRIPTION OF EMBODIMENTS

The embodiments of the present invention will now be explained, referencing the drawings. Furthermore, the embodiments below are merely illustrative examples of the present invention and do not limit its technical scope.

<Air Conditioner>

Figure 1:
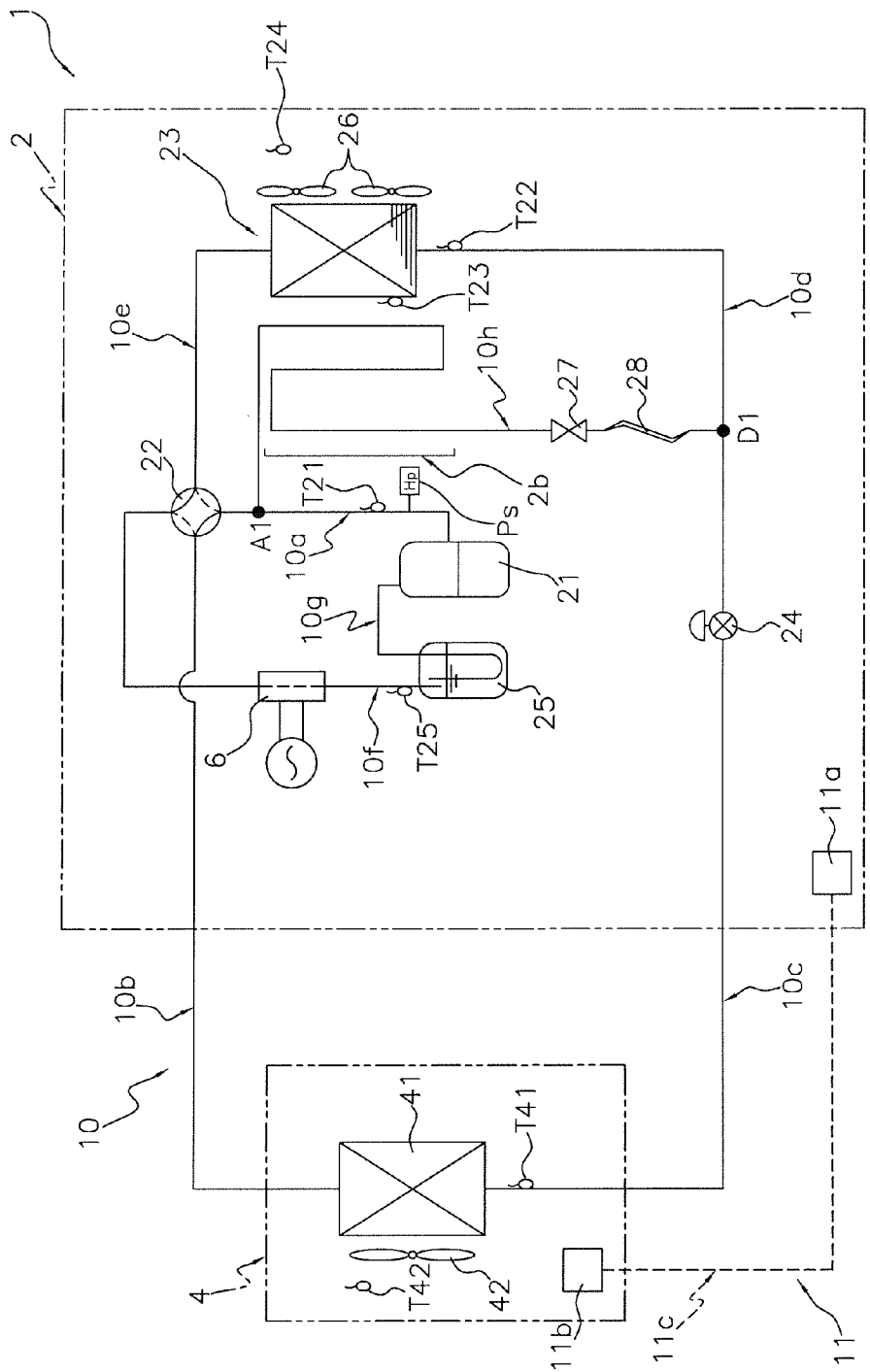
FIG. 1 is a refrigerant circuit diagram of an air conditioner that uses a refrigeration apparatus according to one embodiment of the present invention.

FIG. 1 is a block diagram of an air conditioner that uses a refrigeration apparatus according to one embodiment of the present invention. In an air conditioner 1 in FIG. 1, an outdoor unit 2, which serves as a heat source unit, and an indoor unit 4, which serves as a utilization unit, are connected by refrigerant pipings, and thereby a refrigerant circuit 10 that performs a vapor compression type refrigeration cycle is formed.

The outdoor unit 2 houses a compressor 21, a four-way switching valve 22, an outdoor heat exchanger 23, a motor operated expansion valve 24, an accumulator 25, outdoor fans 26, a hot gas bypass valve 27, a capillary tube 28, and an electromagnetic induction heating unit 6. The indoor unit 4 houses an indoor heat exchanger 41 and an indoor fan 42.

The refrigerant circuit 10 comprises a discharge pipe 10a, a gas pipe 10b, a liquid pipe 10c, an outdoor side liquid pipe 10d, an outdoor side gas pipe 10e, an accumulator pipe 10f, a suction pipe 10g, and a hot gas bypass 10h.

The discharge pipe 10a connects the compressor 21 and the four-way switching valve 22. The gas pipe 10b connects the four-way switching valve 22 and the indoor heat exchanger 41. The liquid pipe 10c connects the indoor heat exchanger 41 and the motor operated expansion valve 24. The outdoor side liquid pipe 10d connects the motor operated expansion valve 24 and the outdoor heat exchanger 23. The outdoor side gas pipe 10e connects the outdoor heat exchanger 23 and the four-way switching valve 22.

The accumulator pipe 10f connects the four-way switching valve 22 and the accumulator 25. The electromagnetic induction heating unit 6 is mounted to one portion of the accumulator pipe 10f. At least the portion of the accumulator pipe 10f that is covered by the electromagnetic induction heating unit 6 and is to be heated is a copper pipe wrapped in a stainless steel pipe. Of the piping that constitutes the refrigerant circuit 10, the portion outside of the stainless steel pipe is copper pipe.

The suction pipe 10g connects the accumulator 25 and the inlet side of the compressor 21. The hot gas bypass 10h connects a branching point A1, which is provided along the discharge pipe 10a, and a branching point D1, which is provided along the outdoor side liquid pipe 10d.

The hot gas bypass valve 27 is disposed along the hot gas bypass 10h. To switch between the state wherein the flow of the refrigerant through the hot gas bypass 10h is permitted and the state wherein it is not permitted, a control unit 11 opens and closes the hot gas bypass valve 27. In addition, the capillary tube 28, wherein the cross sectional area of the refrigerant channel is reduced, is provided on the downstream side of the hot gas bypass valve 27; furthermore, during defrosting operation, a constant ratio of the refrigerant that flows through the outdoor heat exchanger 23 to the refrigerant that flows through the hot gas bypass 10h is maintained.

The four-way switching valve 22 can switch between a cooling operation cycle and a heating operation cycle. In FIG. 1, solid lines indicate the connection state for performing heating operation, and dotted lines indicate the connection state for performing cooling operation. During heating operation, the indoor heat exchanger 41 functions as a condenser, and the outdoor heat exchanger 23 functions as an evaporator. During cooling operation, the outdoor heat exchanger 23 functions as a condenser, and the indoor heat exchanger 41 functions as an evaporator.

The outdoor fans 26, which deliver outdoor air to the outdoor heat exchanger 23, are provided in the vicinity of the outdoor heat exchanger 23. The indoor fan 42, which delivers indoor air to the indoor heat exchanger 41, is provided in the vicinity of the indoor heat exchanger 41.

In addition, various sensors are provided to the outdoor unit 2 and the indoor unit 4.

Specifically, the outdoor unit 2 is provided with: a discharge pressure sensor Ps, which detects a discharge pressure (i.e., a high-pressure pressure Ph) of the compressor 21; a discharge temperature sensor T21, which detects a discharge temperature Td of the compressor 21; a first liquid side temperature sensor T22, which detects a temperature of the refrigerant in the liquid state or the vapor-liquid two-phase state on the liquid side of the outdoor heat exchanger 23; an outdoor heat exchanger sensor T23, which detects a temperature (i.e., an outdoor heat exchanger temperature Tm) of the outdoor heat exchanger 23; and an inlet temperature sensor T25, which detects an inlet temperature (i.e., a suction temperature Tsu) of the accumulator 25. In addition, an outdoor temperature sensor T24, which detects the temperature of the outdoor air that flows into the outdoor unit 2 (i.e., the outdoor temperature Ta), is provided to the outdoor air suction port side of the outdoor unit 2.

In addition, in the indoor unit 4, a second liquid side temperature sensor T41, which detects the temperature of the refrigerant (i.e., the condensing temperature during the heating operation or the refrigerant temperature that corresponds to the evaporating temperature during the cooling operation), is provided to the liquid side of the indoor heat exchanger 41. An indoor temperature sensor T42, which detects the temperature of the indoor air (i.e., an indoor temperature Tr) that flows into the indoor unit 4, is provided to the indoor air suction port side of the indoor unit 4. In the present embodiment, the discharge temperature sensor T21, the first liquid side temperature sensor T22, the outdoor heat exchanger temperature sensor T23, the outdoor temperature sensor T24, the inlet temperature sensor T25, the second liquid side temperature sensor T41, and the indoor temperature sensor T42 are each a thermistor.

The control unit 11 comprises an outdoor control unit 11a and an indoor control unit 11b. The outdoor control unit 11a and the indoor control unit 11b are connected by a communication line 11c. Furthermore, the outdoor control unit 11a controls equipment disposed inside the outdoor unit 2, and the indoor control unit 11b controls equipment disposed inside the indoor unit 4. Furthermore, the control unit 11 is connected such that it can receive detection signals of the various sensors Ps, T21-T25, T41, T42 and such that it can control various valves and equipment 6, 21, 22, 24, 26, 42 based on those detection signals and the like.

(External Appearance of Outdoor Unit)

Figure 2:
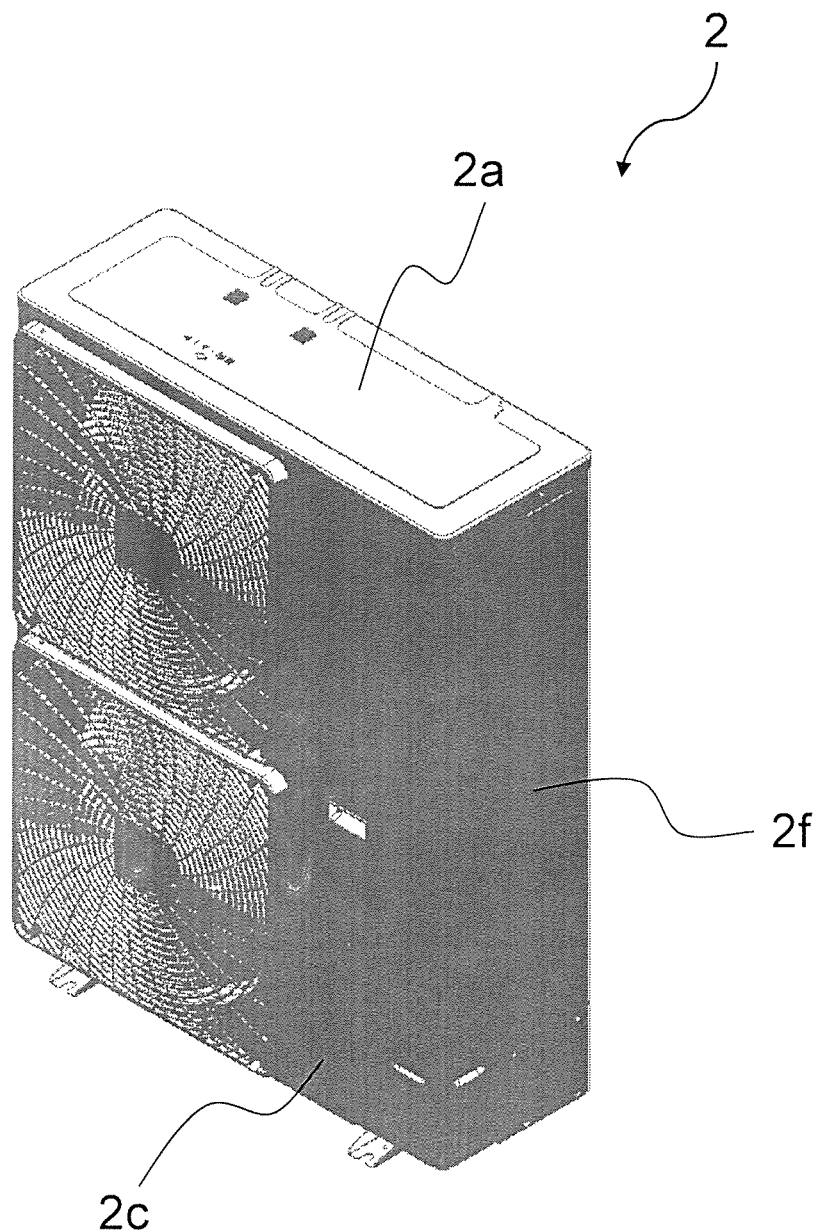
FIG. 2 is an external oblique view of an outdoor unit, viewed from the front surface side.
Figure 3:
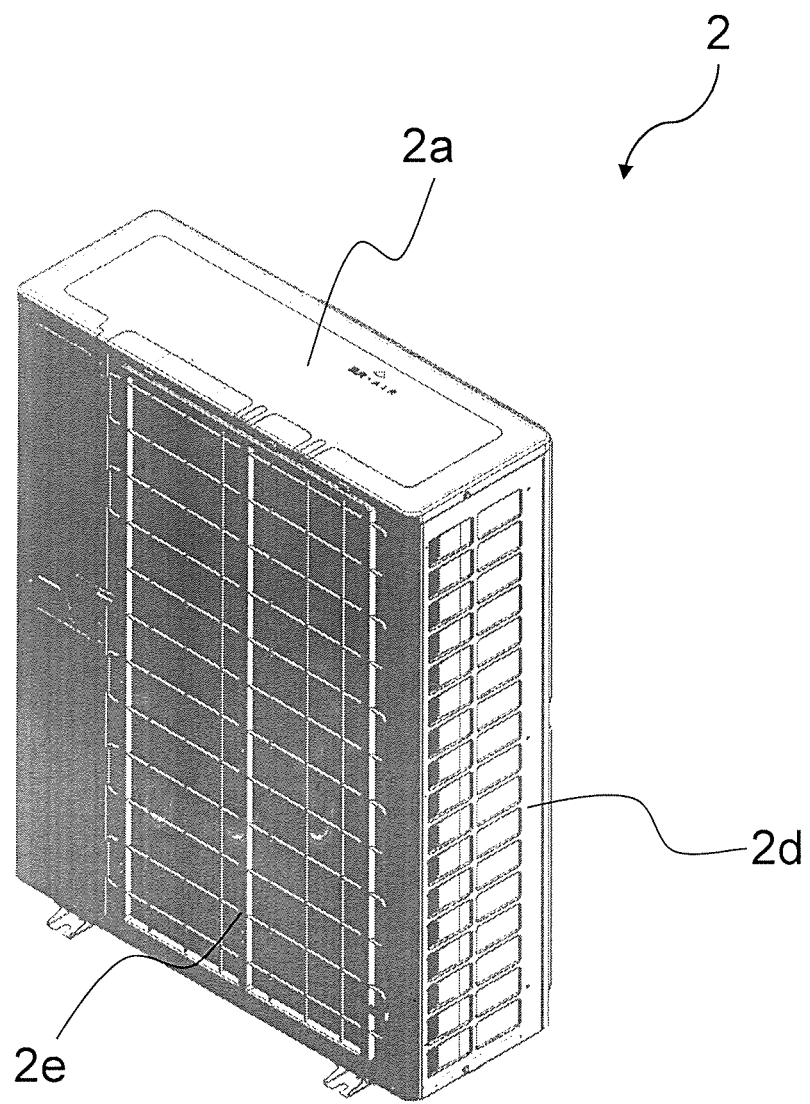
FIG. 3 is an external oblique view of the outdoor unit, viewed from the rear surface side.

FIG. 2 is an external oblique view of the outdoor unit 2, viewed from the front surface side, and FIG. 3 is an external oblique view of the outdoor unit 2, viewed from the rear surface side. In FIG. 2 to FIG. 5, a shell of the outdoor unit 2 is formed as a substantially rectangular parallelepiped by a top plate 2a, a bottom plate 2b, a front panel 2c, a left side surface panel 2d, a right side surface panel 2f, and a rear surface panel 2e.

(Interior of the Outdoor Unit)

Figure 4:
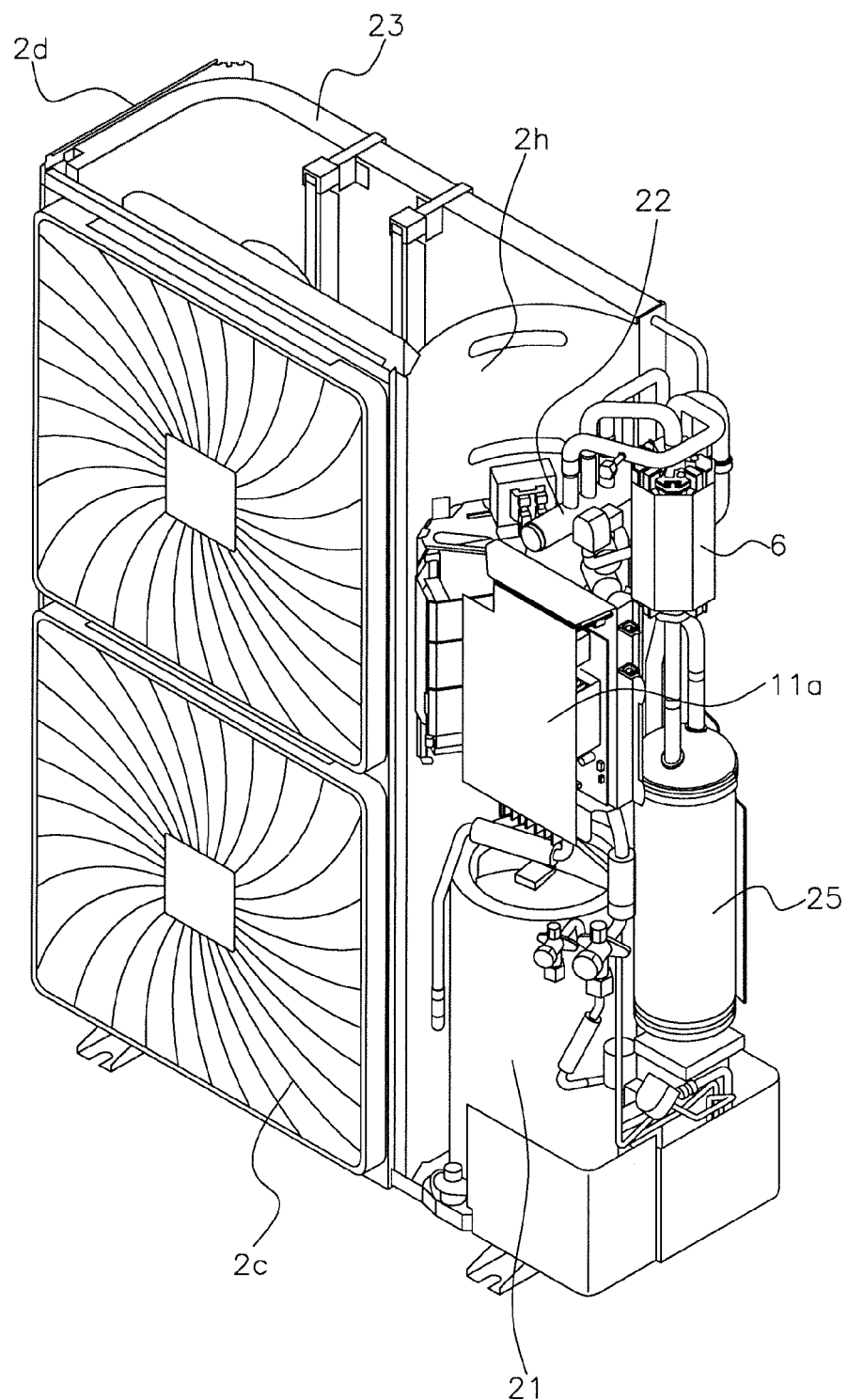
FIG. 4 is an oblique view of the outdoor unit with the right side surface panel and the rear surface panel removed.

FIG. 4 is an oblique view of the outdoor unit 2 with the right side surface panel and the rear surface panel removed. In FIG. 4, a partition plate 2h partitions the outdoor unit 2 into a fan chamber and a machine chamber. The outdoor heat exchanger 23 and the outdoor fans 26 (refer to FIG. 1) are disposed in the fan chamber, and the electromagnetic induction heating unit 6, the compressor 21, and the accumulator 25 are disposed in the machine chamber.

(Structure of Vicinity of Bottom Plate of Outdoor Unit)

Figure 5:
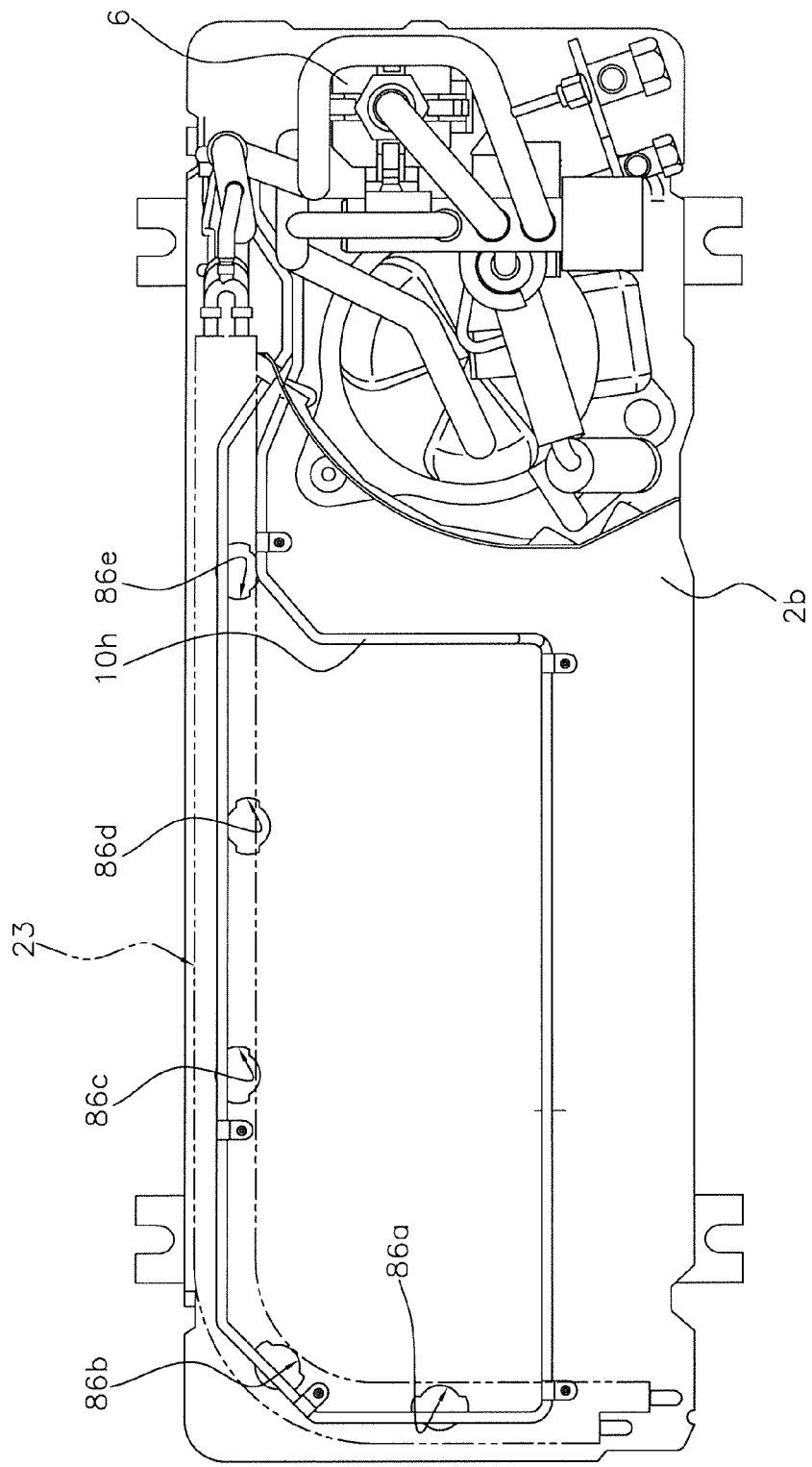
FIG. 5 is a plan view of the outdoor unit with only the bottom plate and the machine chamber remaining.

FIG. 5 is a plan view of the outdoor unit 2 with only the bottom plate 2b and the machine chamber remaining. Furthermore, in FIG. 5, chain double-dashed lines are used to represent the outdoor heat exchanger 23 so that its position is known. The hot gas bypass 10h is disposed above the bottom plate 2b, extends from the machine chamber, wherein the compressor 21 is positioned, to the fan chamber, makes a circuit through the fan chamber, and then returns to the machine chamber. Approximately half of the overall length of the hot gas bypass 10h lies below the outdoor heat exchanger 23. In addition, water discharge ports 86a-86e, which pass through the bottom plate 2b in the plate thickness directions, are formed in portions of the bottom plate 2b that are positioned below the outdoor heat exchanger 23.

(Electromagnetic Induction Heating Unit)

Figure 6:
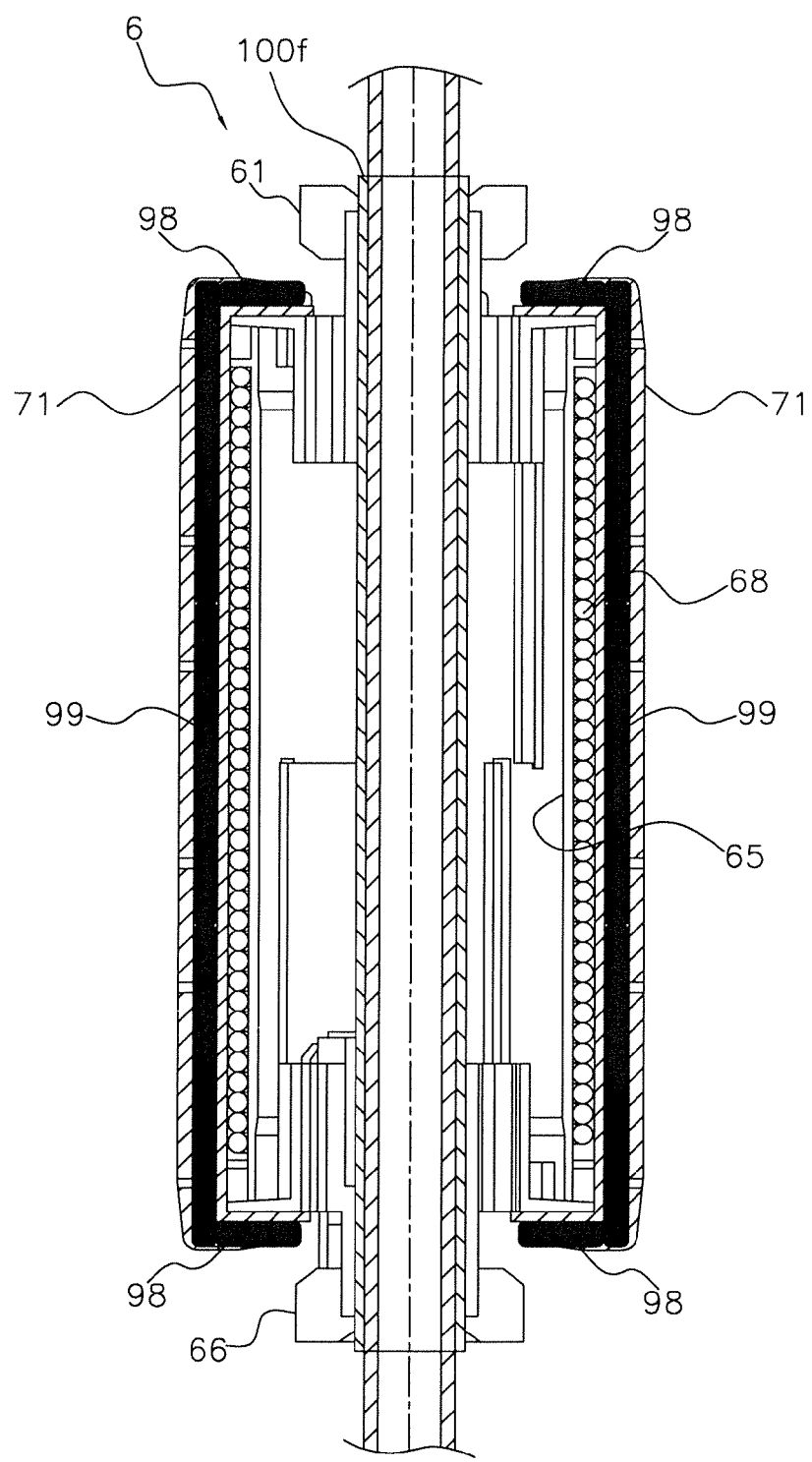
FIG. 6 is a cross sectional view of an electromagnetic induction heating unit.

FIG. 6 is a cross sectional view of the electromagnetic induction heating unit 6. In FIG. 6, the electromagnetic induction heating unit 6 is disposed such that the portion of the accumulator pipe 10f that is to be heated is covered from the outer side in the radial directions and heated by electromagnetic induction. The portion of the accumulator pipe 10f to be heated has a double pipe structure comprising a copper pipe on the inner side and a stainless steel pipe 100f on the outer side. Ferritic stainless steel that contains 16%-18% chrome or precipitation hardening stainless steel that contains 3%-5% nickel, 15%-17.5% chrome, and 3%-5% copper is used as the stainless steel material of the stainless steel pipe 100f.

First, the electromagnetic induction heating unit 6 is positioned at the accumulator pipe 10f; next, the vicinity of the upper end of the electromagnetic induction heating unit 6 is fixed by a first hex nut 61; lastly, the vicinity of the lower end of the electromagnetic induction heating unit 6 is fixed by a second hex nut 66.

A coil 68 is wound helically around the outer side of a bobbin main body 65, with the directions in which the accumulator pipe 10f extends being the axial directions of the winding. The coil 68 is housed on the inner side of a ferrite case 71. The ferrite case 71 further houses first ferrite parts 98 and second ferrite parts 99.

The first ferrite parts 98 are formed from ferrite, which has high magnetic permeability; furthermore, when an electric current flows to the coil 68, the first ferrite parts 98 capture the magnetic flux generated even in portions outside of the stainless steel pipe 100f and form a path for that magnetic flux. The first ferrite parts 98 are positioned on both end sides of the ferrite case 71.

Although their placement positions and shapes differ from those of the first ferrite parts 98, the second ferrite parts 99 function in the same manner as the first ferrite parts 98 and are positioned in the housing part of the ferrite case 71 in the vicinity of the outer side of the bobbin main body 65.

<Operation of Air Conditioner>

In the air conditioner 1, the four-way switching valve 22 is capable of switching between cooling operation and heating operation.

(Cooling Operation)

In cooling operation, the four-way switching valve 22 is set to the state indicated by the dotted lines in FIG. 1. When the compressor 21 is operated in this state, a vapor compression refrigeration cycle is performed in the refrigerant circuit 10 wherein the outdoor heat exchanger 23 becomes a condenser and the indoor heat exchanger 41 becomes an evaporator.

The outdoor heat exchanger 23 exchanges the heat of the high pressure refrigerant discharged from the compressor 21 with the outdoor air, whereupon the refrigerant condenses. When the refrigerant that passed through the outdoor heat exchanger 23 passes through the expansion valve 24, the refrigerant's pressure is reduced; subsequently, the indoor heat exchanger 41 exchanges the heat of the refrigerant with the indoor air, whereupon the refrigerant evaporates. Furthermore, the indoor air, whose temperature has dropped owing to the exchange of its heat with the refrigerant, is blown out to a space to be air conditioned. The refrigerant that passed through the indoor heat exchanger 41 is suctioned into the compressor 21 and compressed.

(Heating Operation)

In the heating operation, the four-way switching valve 22 is set to the state indicated by the solid lines in FIG. 1. When the compressor 21 is operated in this state, the vapor compression refrigeration cycle is performed in the refrigerant circuit 10, wherein the outdoor heat exchanger 23 becomes an evaporator and the indoor heat exchanger 41 becomes a condenser.

The indoor heat exchanger 41 exchanges the heat of the high pressure refrigerant discharged from the compressor 21 with the indoor air, whereupon the refrigerant condenses. Furthermore, the indoor air, whose temperature has risen owing to the exchange of its heat with the refrigerant, is blown out to the space to be air conditioned. When the condensed refrigerant passes through the expansion valve 24, the refrigerant's pressure is reduced; subsequently, the outdoor heat exchanger 23 exchanges the heat of the refrigerant with the outdoor air, whereupon the refrigerant evaporates. The refrigerant that passed through the outdoor heat exchanger 23 is suctioned into the compressor 21, where it is compressed.

In heating operation, capacity shortfall can be supplemented at startup, particularly when the compressor 21 is not sufficiently warmed up, by the electromagnetic induction heating unit 6 heating the refrigerant.

(Defrosting Operation)

When the outdoor air temperature is between −5° C. and +5° C. and heating operation has been performed, moisture contained in the air either condenses on the surface of the outdoor heat exchanger 23 and then turns to frost or freezes and covers the surface of the outdoor heat exchanger 23, in both cases reducing heat exchange performance. The defrosting operation is performed to melt the frost or ice adhered to the outdoor heat exchanger 23. The defrosting operation is performed with the same cycle as that of the cooling operation.

The heat of the high pressure refrigerant discharged from the compressor 21 is exchanged with the outdoor air by the outdoor heat exchanger 23, whereupon the refrigerant condenses. The heat radiated from that refrigerant melts the frost or ice covering the outdoor heat exchanger 23. When the condensed refrigerant passes through the expansion valve 24, its pressure is reduced; subsequently, the indoor heat exchanger 41 exchanges the heat of the refrigerant with the indoor air, whereupon the refrigerant evaporates. At this time, the indoor fan 42 is stopped. This is because if the indoor fan 42 were operating, then cooled air would be blown out to the space to be air conditioned, which would adversely affect user comfort. Furthermore, the refrigerant that passed through the indoor heat exchanger 41 is suctioned into the compressor 21 and compressed.

In addition, during defrosting operation, the electromagnetic induction heating unit 6 heats the accumulator pipe 10f, and thereby the compressor 21 can compress the heated refrigerant. As a result, the temperature of the gas refrigerant discharged from the compressor 21 rises, and the time needed to melt the frost decreases. Furthermore, the time needed to return from the defrosting operation back to the heating operation shortens.

In addition, during defrosting operation, the high pressure refrigerant discharged from the compressor 21 flows also to the hot gas bypass 10h. Even if ice grows on the bottom plate 2b of the outdoor unit 2, that ice is melted by the heat radiated from the refrigerant that passes through the hot gas bypass 10h. The water produced at that time is discharged via the water discharge ports 86a-86e. In addition, the hot gas bypass 10h also heats the water discharge ports 86a-86e, which prevents the water discharge ports 86a-86e from freezing and getting plugged up.

(Forced Inhibit Control of the Electromagnetic Induction Heating Unit)

When any one of the conditions (1)-(11) below holds true, a forced inhibit signal sent to the electromagnetic induction heating unit 6 is set to the ON state (i.e., the electromagnetic induction heating unit 6 is inhibited from performing heating); conversely, if none of the conditions below hold true, then the forced inhibit signal sent to the electromagnetic induction heating unit 6 is set to the OFF state (i.e., the electromagnetic induction heating unit 6 is permitted to perform heating); hereinbelow, this control is called forced inhibit control.

The conditions are explained below.

(1) If the Difference Between an Indoor Set Temperature and the Indoor Temperature is Less than a Prescribed Temperature A temperature difference $\Delta Trs$ is calculated by subtracting the indoor temperature Tr, which is detected by the indoor temperature sensor T42, from an indoor set temperature Tse, which serves as the indoor space target set temperature and is set by an inputting means (not shown) such as a remote control; when the temperature difference $\Delta Trs$ is less than a prescribed value, the control unit 11 sets the forced inhibit signal sent to the electromagnetic induction heating unit 6 to the ON state. Namely, if the heating operation load is small or zero, then there is no need for the electromagnetic induction heating unit 6 to assist the heating operation, and consequently the electromagnetic induction heating unit 6 is forcibly inhibited from heating the refrigerant. Consequently, it is possible to perform heating operation while preventing the wasteful operation of the electromagnetic induction heating unit 6. Furthermore, the prescribed value can be set in four steps, as shown in FIG. 7, and can be set in accordance with the user's preference. For example, if the user can tolerate cold or wants to emphasize energy conservation, then the user can set the prescribed temperature to 2K by setting the prescribed temperature to level 4. If set as such, the electromagnetic induction heating unit 6 transitions to the state wherein heating is permitted if the state arises wherein the indoor temperature Tr is lower than the indoor set temperature Tse by 2K. In addition, conversely, if the user cannot tolerate cold or wants to emphasize comfort, then the user can set the prescribed temperature to −0.5K by setting the prescribed temperature to level 1. Furthermore, if set as such, the electromagnetic induction heating unit 6 transitions to the state wherein heating is permitted if the state arises wherein the indoor temperature Tr is higher than the indoor set temperature Tse by 0.5K. Furthermore, at initialization (i.e., the state when shipped from the factory), the prescribed temperature is set to level 3.

(2) When the Compressor is Stopped

If the compressor 21 is stopped, then the thermo-OFF state is active even during heating operation, and therefore there is no need for the electromagnetic induction heating unit 6 to assist the heating operation. Consequently, if the compressor 21 is stopped, the forced inhibit signal sent to the electromagnetic induction heating unit 6 is set to the ON state. Consequently, it is possible to prevent the wasteful operation of the electromagnetic induction heating unit 6.

(3) When Performing Low Pressure Droop Control

In the air conditioner 1, if a low-pressure pressure Pl becomes lower than or equal to a first pressure P1, then low pressure droop control is performed wherein the compressor frequency of the compressor 21 is minimized to make the operating capacity small. When this low pressure droop control is performed, the forced inhibit signal sent to the electromagnetic induction heating unit 6 is set to the ON state. Furthermore, the low-pressure pressure Pl is calculated based on the outdoor heat exchanger temperature Tm detected by the outdoor heat exchanger temperature sensor T23.

(4) When Performing High Pressure Droop Control

In the air conditioner 1, if the high-pressure pressure Ph detected by a discharge pressure sensor Ps is greater than or equal to a second pressure P2, then high pressure droop control is performed wherein the compressor frequency of the compressor 21 is minimized to make the operating capacity small. When this high pressure droop control is performed, the forced inhibit signal sent to the electromagnetic induction heating unit 6 is set to the ON state.

(5) When Inverter Discharge Pipe Temperature Droop Control is Performed

In the air conditioner 1, if the discharge temperature Td detected by the discharge temperature sensor T21 deviates from a first temperature range (e.g., if the discharge temperature Td exceeds a first temperature), then inverter discharge pipe temperature drooping control is performed wherein the compressor frequency of the compressor 21 is minimized to make the operating capacity small. When this inverter discharge pipe temperature drooping control is performed, the forced inhibit signal sent to the electromagnetic induction heating unit 6 is set to the ON state.

(6) When Inverter Electric Current Droop Control is Performed

In the air conditioner 1, the operating capacity of the compressor 21 can be controlled by virtue of an inverter (not shown) controlling the rotational frequency. Furthermore, if the electric current applied to this inverter exceeds a prescribed electric current value, then the inverter electric current droop control is performed wherein the inverter of the compressor 21 minimizes the rotational frequency to make the operating capacity of the compressor 21 small. When this inverter electric current droop control is performed, the forced inhibit signal sent to the electromagnetic induction heating unit 6 is set to the ON state.

(7) When Low Pressure Differential/Low Compression Ratio Protection Control is Performed In the air conditioner 1, if the difference between the low-pressure pressure Pl and the high-pressure pressure Ph is small and the compression ratio of the compressor 21 is small, then low pressure differential/low compression ratio protection control is performed. Specifically, if the pressure differential between the low-pressure pressure Pl and the high-pressure pressure Ph is smaller than a third pressure P3, then low pressure differential/low compression ratio protection control is performed, wherein the opening degree of the motor operated expansion valve 24 is decreased and the airflow of the outdoor fans 26 is increased. When low pressure differential/low compression ratio protection control is being performed, the forced inhibit signal sent to the electromagnetic induction heating unit 6 is set to the ON state. Furthermore, here, as discussed above, the low-pressure pressure Pl is calculated based on the outdoor heat exchanger temperature Tm detected by the outdoor heat exchanger temperature sensor T23. In addition, in the same manner as discussed above, the high-pressure pressure Ph is detected by the discharge pressure sensor Ps.

(8) When Inverter Circuit Electric Current/Temperature Droop Control is Performed In the air conditioner 1, if the electric current flowing through the inverter circuit increases and deviates from a first prescribed range (e.g., if the electric current flowing through the inverter circuit is greater than or equal to a first prescribed upper limit electric current) or if the temperature of the inverter circuit component rises and deviates from a second temperature range (e.g., if the temperature of the inverter circuit component is greater than or equal to a prescribed upper limit temperature), then inverter circuit electric current/temperature droop control is performed wherein the inverter of the compressor 21 minimizes the rotational frequency to make the operating capacity of the compressor 21 small. When this inverter circuit electric current/temperature droop control is being performed, the forced inhibit signal sent to the electromagnetic induction heating unit 6 is set to the ON state.

(9) When Total Electric Current Droop Control is Performed

In the air conditioner 1, if the value of an electric current applied to the entire air conditioner 1 (i.e., a total electric current value) deviates from a second prescribed range (e.g., if the total electric current value exceeds a second prescribed upper limit electric current value), then total electric current droop control is performed wherein the inverter of the compressor 21 minimizes the rotational frequency to make the operating capacity of the compressor 21 small. When this total electric current droop control is being performed, the forced inhibit signal sent to the electromagnetic induction heating unit 6 is set to the ON state. Furthermore, in the present embodiment, "total electric current value" referred to herein is a value calculated by summing the electric current value applied to the compressor 21 and the electric current value applied to the outdoor fans 26.

However, the total electric current value is not limited thereto and may be a value calculated by further adding the value of the electric current applied to the indoor unit 4 and/or the value of the electric current applied to the electromagnetic induction heating unit 6 to the value that is the sum of the value of the electric current applied to the compressor 21 and the value of the electric current applied to the outdoor fans 26. In such a case, the total electric current value is not the second prescribed upper limit electric current value discussed above but rather is a third prescribed upper limit electric current value, which is greater than the second prescribed upper limit electric current value.

Furthermore, in (3)-(9) above, if the compressor frequency is minimized and the amount of the refrigerant circulating through the refrigerant circuit 10 is small, then the amount of the refrigerant that can be heated by the electromagnetic induction heating unit 6 is small, making it problematic to heat the refrigerant efficiently. Accordingly, it is possible to prevent the wasteful heating of the refrigerant by the electromagnetic induction heating unit 6.

(10) If a Gas Deficiency Warning State is Active

In the air conditioner 1, if a suction overheating degree, which is derived by subtracting the outdoor heat exchanger temperature Tm detected by the outdoor heat exchanger temperature sensor T23 from the suction temperature Tsu detected by the inlet temperature sensor T25, is greater than or equal to the prescribed temperature, then it is determined that the amount of refrigerant filled in the refrigerant circuit (i.e., the refrigerant fill amount) has deviated from a third prescribed range (e.g., the refrigerant fill amount is less than the prescribed lower limit amount of refrigerant). Furthermore, in the air conditioner 1, if it is determined that the amount of refrigerant filled in the refrigerant circuit has deviated from the third prescribed range, then the gas deficiency warning state becomes active. If the gas deficiency warning state is active, then the forced inhibit signal sent to the electromagnetic induction heating unit 6 is set to the ON state.

(11) If Electromagnetic Induction Heating Unit is Set to ON Inhibited

In the air conditioner 1, the electromagnetic induction heating unit 6 is set to ON inhibited at initialization. When the user wants to enable use of the electromagnetic induction heating unit 6, user can manually cancel the ON inhibited setting of the electromagnetic induction heating unit 6. In addition, if on the other hand the ON inhibited setting of the electromagnetic induction heating unit 6 has been cancelled, the user can once again manually set the electromagnetic induction heating unit 6 to ON inhibited. Thus, if the electromagnetic induction heating unit 6 is set to ON inhibited, then the forced inhibit signal sent to the electromagnetic induction heating unit 6 is set to the ON state.

<Characteristics>

In the air conditioner 1 according to the present embodiment, the electromagnetic induction heating unit 6 is set to the forced inhibit state so that it does not operate if one or more of the following conditions holds true: the electromagnetic induction heating unit 6 has been manually set to operation inhibited; the air conditioning load is small (specifically, the difference between the indoor set temperature Tse and the indoor temperature Tr is less than the prescribed temperature, or the compressor 21 is stopped); or the amount of circulating refrigerant is small (specifically, when low pressure droop control, high pressure droop control, inverter discharge pipe temperature droop control, inverter electric current droop control, low pressure differential/low compression ratio protection control, inverter circuit electric current/temperature droop control, or total electric current droop control is being performed, or when the gas deficiency warning state is active).

Accordingly, it is possible to prevent the wasteful operation of the electromagnetic induction heating unit 6 if there is no need to heat the refrigerant and therefore operation efficiency would be reduced were the electromagnetic induction heating unit 6 to operate. In addition, if the electromagnetic induction heating unit 6 is set so that it does not operate (i.e., if the electromagnetic induction heating unit 6 has been manually set to operation inhibited), then the operation of the electromagnetic induction heating unit 6 can be inhibited.

MODIFIED EXAMPLES

In the air conditioner 1 according to the above embodiment, if the difference between the indoor set temperature Tse and the indoor temperature Tr is less than the prescribed temperature, then forced inhibit control is performed wherein the electromagnetic induction heating unit 6 is set to the forced inhibit state, and this prescribed temperature can be set in four steps, as shown in FIG. 7; however, the present invention is not limited thereto. Even when switching from thermo-ON to thermo-OFF or thermo-OFF to thermo-ON, the determination is made based on a temperature condition, namely, the difference between the indoor set temperature Tse and the indoor temperature Tr, and consequently the prescribed temperature when forced inhibit control is performed may be linked to a temperature condition for use when switching from thermo-ON to thermo-OFF and a temperature condition for use when switching from thermo-OFF to thermo-ON.

INDUSTRIAL APPLICABILITY

The present invention is useful in an air conditioner for cold regions.

What is claimed is:

1. An air conditioner, comprising:
   a refrigerant circuit including a compressing mechanism with an adjustable operating capacity, a heat source side heat exchanger, an expansion mechanism, and a utilization side heat exchanger;
   an electromagnetic induction heating unit arranged and configured to heat a refrigerant piping and/or a member that is in thermal contact with a refrigerant that flows through the refrigerant piping; and
   a control unit configured to set the electromagnetic induction heating unit to a forced inhibit state if any one of
   a condition in which an air conditioning load is small is satisfied, and
   a condition in which an amount of circulating refrigerant is small is satisfied,
   the condition in which the amount of circulating refrigerant is small being satisfied when a pressure on a low pressure side is less than or equal to a pressure and a limit is applied to the operating capacity of the compressing mechanism.

2. An air conditioner wherein comprising:
   a refrigerant circuit including a compressing mechanism with an adjustable operating capacity, a heat source side heat exchanger, an expansion mechanism, and a utilization side heat exchanger;
   an electromagnetic induction heating unit arranged and configured to heat a refrigerant piping and/or a member that is in thermal contact with a refrigerant that flows through the refrigerant piping; and
   a control unit configured to set the electromagnetic induction heating unit to a forced inhibit state if any one of
   a condition in which an air conditioning load is small is satisfied, and a condition in which an amount of circulating refrigerant is small is satisfied, the condition in which the amount of circulating refrigerant is small being satisfied when a pressure on a high pressure side is greater than or equal to a pressure and a limit is applied to the operating capacity of the compressing mechanism.

3. The air conditioner according to claim 1, wherein the condition in which the amount of circulating refrigerant is small is satisfied when a temperature on a discharge side of the compressing mechanism deviates from a temperature range and a limit is applied to the operating capacity of the compressing mechanism.

4. The air conditioner according to claim 1, wherein the compressing mechanism includes a motor serving as a motive power source, and the operating capacity of the compressing mechanism is adjustable by using an inverter circuit to perform rotational frequency control on the motor; and it is determined that the condition in which the amount of circulating refrigerant is small is satisfied when a limit is applied to the operating capacity of the compressing mechanism by using the inverter circuit to lower the rotational speed of the motor.

5. The air conditioner according to claim 1, further comprising
a heat source side fan arranged to promote exchange of heat by the heat source side heat exchanger,
the condition in which the amount of circulating refrigerant is small being satisfied when a pressure differential between pressure on a high pressure side and pressure on a low pressure side in the refrigerant circuit is smaller than a pressure and a limit is applied to an output of the heat source side fan.

6. The air conditioner according to claim 1, wherein the condition in which the amount of circulating refrigerant is small is satisfied when
an electric current value of the compressing mechanism deviates from a prescribed range and a limit is applied to the operating capacity of the compressing mechanism, or
a temperature of an electrical component in an inverter circuit deviates from a temperature range and a limit is applied to the operating capacity of the compressing mechanism.

7. The air conditioner according to claim 1, further comprising
a heat source side fan arranged to promote exchange of heat by the heat source side heat exchanger,
the compressing mechanism, the heat source side heat exchanger, and the heat source side fan being included in a heat source unit; and
the condition in which the amount of circulating refrigerant is small being satisfied when a total electric current value deviates from a prescribed range and a limit is applied to the operating capacity of the compressing mechanism, the total electric current value being based on a sum of
a value of electric current applied to the compressing mechanism and
a value of electric current applied to the heat source side fan.

8. The air conditioner according to claim 7, wherein the utilization side heat exchanger is included in a utilization unit; and
the total electric current value is a value calculated by adding
a value of electric current applied to the utilization unit and/or a value of electric current applied to the electromagnetic induction heating unit to
the sum of the value of the electric current applied to the compressing mechanism and the value of the electric current applied to the heat source side fan.

9. The air conditioner according to claim 1, wherein the condition in which the amount of circulating refrigerant is small is satisfied when an amount of refrigerant filled in the refrigerant circuit deviates from a prescribed range and a limit is applied to the operating capacity of the compressing mechanism.

10. The air conditioner according to claim 9, wherein it is determined that the amount of refrigerant filled in the refrigerant circuit deviates from the prescribed range when a suction overheating degree of the compressing mechanism exceeds a prescribed temperature.

11. The air conditioner according claim 2, wherein the compressing mechanism includes a motor serving as a motive power source, and the operating capacity of the compressing mechanism is adjustable by using an inverter circuit to perform rotational frequency control on the motor; and
the limit is applied to the operating capacity of the compressing mechanism us the inverter circuit to lower the rotational speed of the motor.

12. The air conditioner according claim 3, wherein the compressing mechanism includes a motor serving as a motive power source, and the operating capacity of the compressing mechanism is adjustable by using an inverter circuit to perform rotational frequency control on the motor; and
the limit is applied to the operating capacity of the compressing mechanism by using the inverter circuit to lower the rotational speed of the motor.

13. The air conditioner according to claim 1, wherein the forced inhibit state is a state in which heating by the electromagnetic induction heating unit is inhibited.

14. An air conditioner, comprising:
a refrigerant circuit including a compressing mechanism with an adjustable operating capacity, a heat source side heat exchanger, an expansion mechanism, and a utilization side heat exchanger;
a heat source side fan arranged to promote exchange of heat by the heat source side heat exchanger;
an electromagnetic induction heating unit arranged and configured to heat a refrigerant piping and/or a member that is in thermal contact with a refrigerant that flows through the refrigerant piping; and
a control unit configured to set the electromagnetic induction heating unit to a forced inhibit state if any one of
a condition in which a difference between an indoor set temperature and an indoor temperature is less than a prescribed temperature, or the compressing mechanism is stopped, is satisfied, and
a condition in which any one of low pressure droop control, high pressure droop control, inverter discharge pipe temperature droop control, inverter electric current droop control, pressure differential/compression ratio protection control, inverter circuit electric current/temperature droop control, and total electric current droop control is performed, or a gas deficiency warning state is active, is satisfied,
the compressing mechanism, the heat source side heat exchanger, and the heat source side fan being included in a heat source unit, and a value of total electric current being a sum of a value of electric current applied to the compressing mechanism and a value of electric current applied to the heat source side fan.

15. The air conditioner according to claim 14, wherein the forced inhibit state is a state in heating by the electromagnetic induction heating unit is inhibited.

\* \* \* \* \*